US011908650B2

(12) United States Patent
Kawaguchi et al.

(10) Patent No.: US 11,908,650 B2
(45) Date of Patent: Feb. 20, 2024

(54) ELECTROMAGNETIC RELAY

(71) Applicant: OMRON Corporation, Kyoto (JP)

(72) Inventors: Naoki Kawaguchi, Kyoto (JP); Takeshi Nishida, Kyoto (JP); Kazuki Furukawa, Kyoto (JP); Takashi Tsukada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/847,168

(22) Filed: Jun. 23, 2022

(65) Prior Publication Data

US 2023/0008722 A1 Jan. 12, 2023

(30) Foreign Application Priority Data

Jul. 6, 2021 (JP) ................................ 2021-111971

(51) Int. Cl.
*H01H 50/28* (2006.01)
*H01H 50/44* (2006.01)
*H01H 50/04* (2006.01)

(52) U.S. Cl.
CPC ........ *H01H 50/443* (2013.01); *H01H 50/042* (2013.01); *H01H 50/28* (2013.01)

(58) Field of Classification Search
CPC ...... H01H 50/60; H01H 50/14; H01H 50/163; H01H 50/58; H01H 2205/002; H01H 9/302; H01H 9/34; H01H 50/023; H01H 50/54; H01H 50/443; H01H 50/042; H01H 50/28; H01H 9/346; H01H 9/443; H01H 50/546; H01H 50/26; H01H 9/44
See application file for complete search history.

(56) References Cited

U.S. PATENT DOCUMENTS

| | | | | |
|---|---|---|---|---|
| 4,421,959 A * | 12/1983 | Chen | H01H 9/38 | 200/243 |
| 5,546,061 A * | 8/1996 | Okabayashi | H01H 9/443 | 335/126 |
| 6,700,466 B1 * | 3/2004 | Yamamoto | H01H 9/302 | 335/201 |

(Continued)

FOREIGN PATENT DOCUMENTS

JP 2015-49938 A 3/2015

*Primary Examiner* — Shawki S Ismail
*Assistant Examiner* — Lisa N Homza
(74) *Attorney, Agent, or Firm* — SHINJYU GLOBAL IP

(57) ABSTRACT

An electromagnetic relay includes a first fixed terminal including a first fixed contact, a second fixed terminal including a second fixed contact, a movable contact piece including first and second contacts, a drive device including a coil, a case, and a magnet. The case includes an accommodation space accommodating the first fixed contact, the second fixed contact, and the movable contact piece, and a first arc extension space at least partially disposed between the coil and the magnet. The magnet is disposed so as to overlap with the coil in a third direction orthogonal to the moving direction and a longitudinal direction of the movable contact piece. The magnet configured to extend a first arc generated between the first fixed contact and the first movable contact and a second arc generated between the second fixed contact and the second movable contact in the longitudinal direction of the movable contact piece.

8 Claims, 13 Drawing Sheets

(56) References Cited

U.S. PATENT DOCUMENTS

| | | | | |
|---|---|---|---|---|
| 6,975,194 | B2 * | 12/2005 | Nishida | H01H 51/2209 335/201 |
| 8,519,811 | B2 * | 8/2013 | Sugisawa | H01H 1/54 335/201 |
| 11,158,474 | B2 * | 10/2021 | Ikushima | H01H 50/54 |
| 2010/0060394 | A1 * | 3/2010 | Nagura | H01H 9/443 335/189 |
| 2012/0313737 | A1 * | 12/2012 | Iwamoto | H01H 51/06 335/185 |
| 2016/0233039 | A1 | 8/2016 | Kanematsu et al. | |
| 2018/0182584 | A1 * | 6/2018 | Iwamoto | H01H 50/18 |
| 2019/0035585 | A1 * | 1/2019 | Minowa | H01H 50/56 |
| 2019/0066951 | A1 | 2/2019 | Kanematsu et al. | |

* cited by examiner

ELECTROMAGNETIC RELAY

This application claims priority to Japanese Patent Application No. 2021-111971, filed Jul. 6, 2021. The contents of that application are incorporated by reference herein in their entirety.

FIELD

The present invention relates to an electromagnetic relay.

BACKGROUND

In an electromagnetic relay, an arc occurs at contacts when the current flow is stopped. For example, in order to extinguish such an arc, the electromagnetic relay disclosed in Japanese Unexamined Patent Application Publication No. 2015-049938 includes an arc-extinguishing member in a space where a contact is disposed.

SUMMARY

In the electromagnetic relay disclosed in Japanese Unexamined Patent Application Publication No. 2015-049938, when a magnet is disposed close the contact such that a magnetic field is generated in the lateral direction of a movable contact piece, the extension direction of an arc generated at the contact varies, depending on the energization direction, between outward and inward in the longitudinal direction of the movable contact piece. When the arc extends inward in the longitudinal direction of the movable contact piece, the arc is short-circuited between the first fixed terminal and the second fixed terminal, making it difficult to quickly cut off the arc.

An object of the present invention is to quickly cut off a short-circuited arc between a first fixed terminal and a second fixed terminal in an electromagnetic relay.

An electromagnetic relay according to one aspect of the present invention includes a first fixed terminal, a second fixed terminal, a movable contact piece, a drive device, a case, and a magnet. The first fixed terminal includes a first fixed contact. The second fixed terminal is disposed apart from the first fixed terminal. The second fixed terminal includes a second fixed contact. The movable contact piece includes a first movable contact facing the first fixed contact and a second movable contact facing the second fixed contact. The drive device includes a coil disposed in a first direction extending from the first movable contact toward the first fixed contact with respect to the movable contact piece. The drive device moves the movable contact piece in moving direction including the first direction and a second direction in which the first movable contact is separated from the first fixed contact. The case includes an accommodation space accommodating the first fixed contact, the second fixed contact, and the movable contact piece. The magnet is disposed so as to overlap with the coil and the accommodation space in a third direction orthogonal to the moving direction and a longitudinal direction of the movable contact piece. The magnet extends a first arc generated between the first fixed contact and the first movable contact and a second arc generated between the second fixed contact and the second movable contact in the longitudinal direction of the movable contact piece. The case includes a first arc extension space that extends in the first direction from the accommodation space and that is at least partially disposed between the coil and the magnet.

In this electromagnetic relay, the first arc and the second arc are extended in the longitudinal direction of the movable contact piece by the magnet. That is, the magnet generates a magnetic field along the third direction between the first fixed contact and the first movable contact and between the second fixed contact and the second movable contact. In this case, the first arc and the second arc are extended inward or outward in the longitudinal direction of the movable contact piece, depending on the energization direction. That is, the first arc and the second arc are extended in a direction approaching each other or in a direction away from each other, depending on the energization direction. For example, when the first arc and the second arc are extended in a direction approaching each other, the first arc and the second arc are short-circuited between the first fixed terminal and the second fixed terminal. The short-circuited arc between the first fixed terminal and the second fixed terminal is extended in the arc extension space, which is disposed between the coil and the magnet, by the magnetic field generated by the magnet. As a result, the short-circuited arc between the first fixed terminal and the second fixed terminal can be quickly cut off.

The case may include a base disposed below the coil. The first fixed terminal may include a first external connection protruding downward from the base. The second fixed terminal may include a second external connection protruding downward from the base. The first arc extension space of the case may be disposed between the base and the coil. In this case, the space below the coil can be effectively used to quickly cut off the short-circuited arc between the first fixed terminal and the second fixed terminal.

The magnet may include a narrow portion and a wide portion. The narrow portion may be disposed between the first external connection and the second external connection and may overlap with the accommodation space in the third direction. The wide portion may extend outward beyond the first external connecting portion and the second external connecting portion in the longitudinal direction of the movable contact piece. The wide portion may overlap with the coil in the third direction. In this case, the short-circuited arc between the first fixed terminal and the second fixed terminal can be extended to backward of the first fixed terminal and the second fixed terminal, resulting in downsizing of the first arc extension space in the first direction.

The case may include a second arc extension space disposed in the second direction with respect to the movable contact piece. The magnet may be disposed so as to overlap with the second arc extension space in the third direction. In this case, when the first arc and the second arc are extended outward in the longitudinal direction of the movable contact piece, the first arc and the second arc can be quickly cut off in the second arc extension space.

The first fixed terminal may include a first extending portion facing the movable contact piece in the longitudinal direction of the movable contact piece. The first extending portion may extend between the accommodation space and the second arc extension space. In this case, when the first arc is extended outward in the longitudinal direction of the movable contact piece, the first extending portion facilitates the movement of the first arc into the second arc extension space.

The case may include a second arc extension space that is disposed outwardly adjacent to the first arc extension space in the longitudinal direction of the movable contact piece and that is partitioned from the first arc extension space. The magnet may be disposed so as to overlap with the second arc extension space in the third direction. In this case, when the first arc and the second arc are extended outward in the longitudinal direction of the movable contact piece, the space below the coil can be effectively used to cut off the first arc and the second arc.

The first fixed terminal may include a first contact supporting portion and a first bent portion. The first contact supporting portion may extend in the longitudinal direction of the movable contact piece and may be disposed in the accommodation space to support the first fixed contact. The first bent portion may be bent toward the first arc extension space from an inner end of the first contact supporting portion in the longitudinal direction of the movable contact piece. In this case, the Lorentz force due to the current flowing through the first bent portion can quickly move the short-circuited arc between the first fixed terminal and the second fixed terminal to the first arc extension space.

The case may include a cover member that is disposed between the first arc extension space and the coil and that covers the first arc extension space. In this case, the coil can be protected from the arc extended in the first arc extension space.

DETAILED DESCRIPTION

Figure 1:
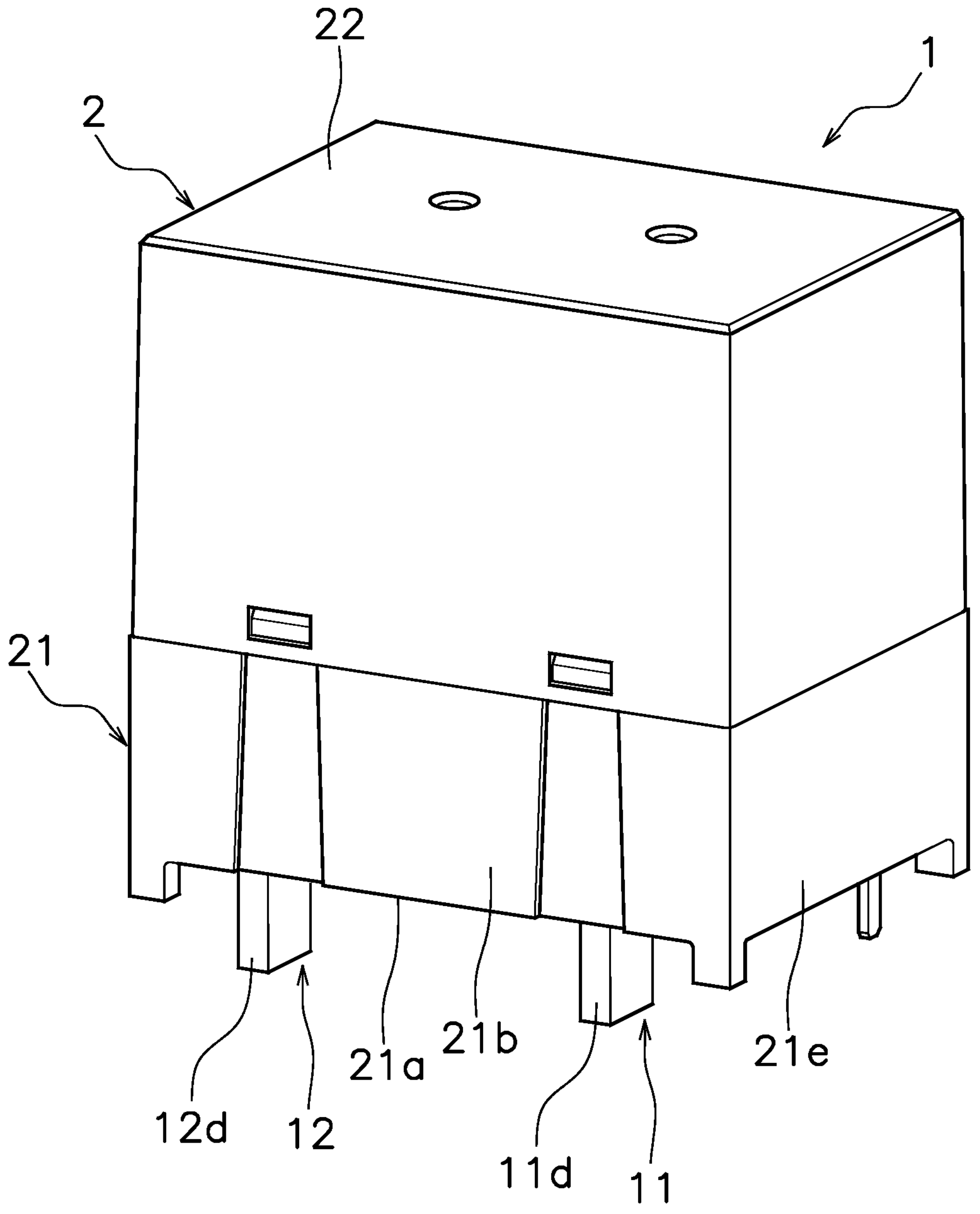
FIG. 1 is a perspective view of an electromagnetic relay.
Figure 2:
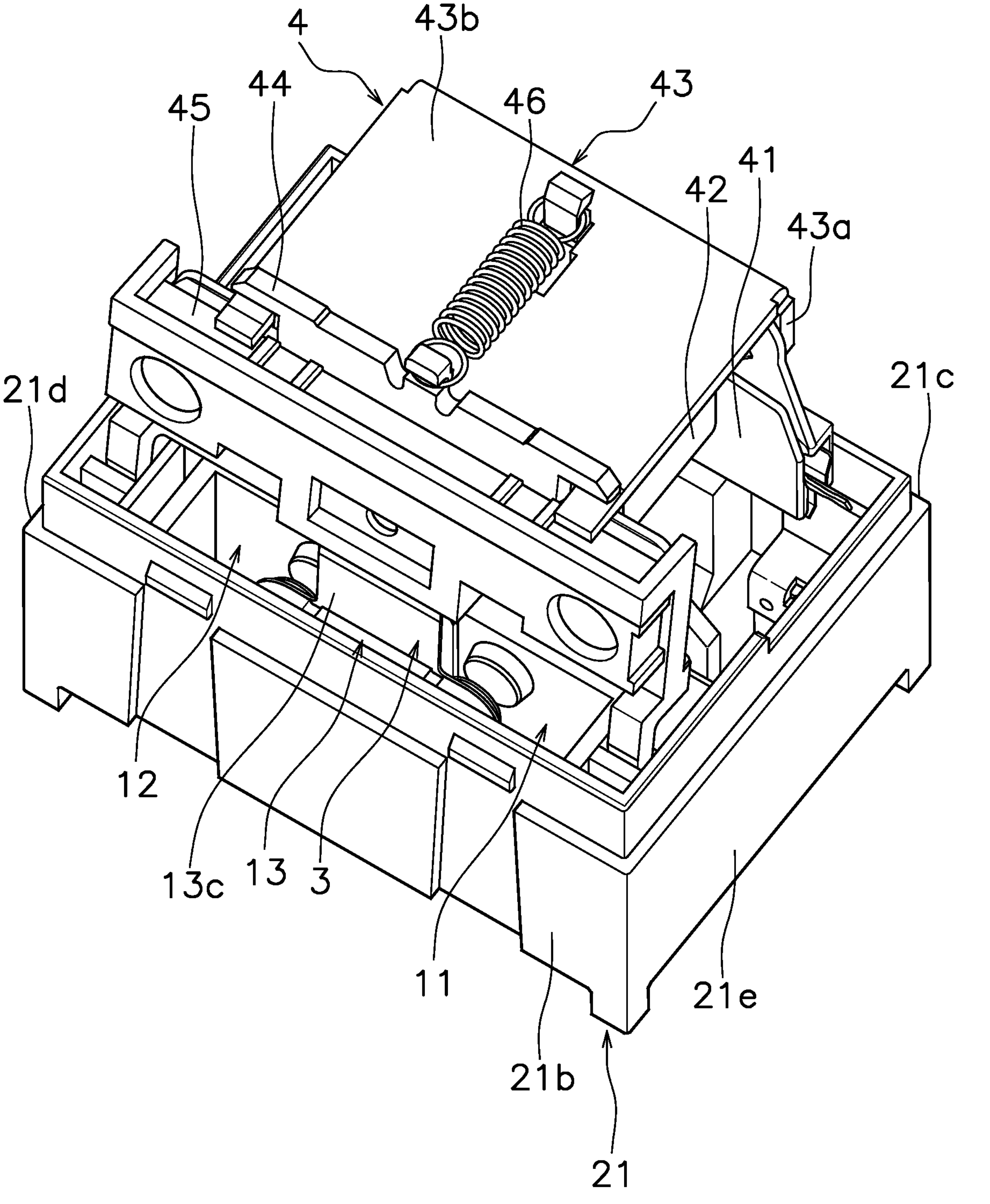
FIG. 2 is a perspective view of an electromagnetic relay with a cover removed.

Hereinafter, an electromagnetic relay 1 according to an embodiment will be described with reference to the drawings. As shown in FIGS. 1 and 2, the electromagnetic relay 1 includes a case 2, a contact device 3, and a drive device 4.

Figure 3:
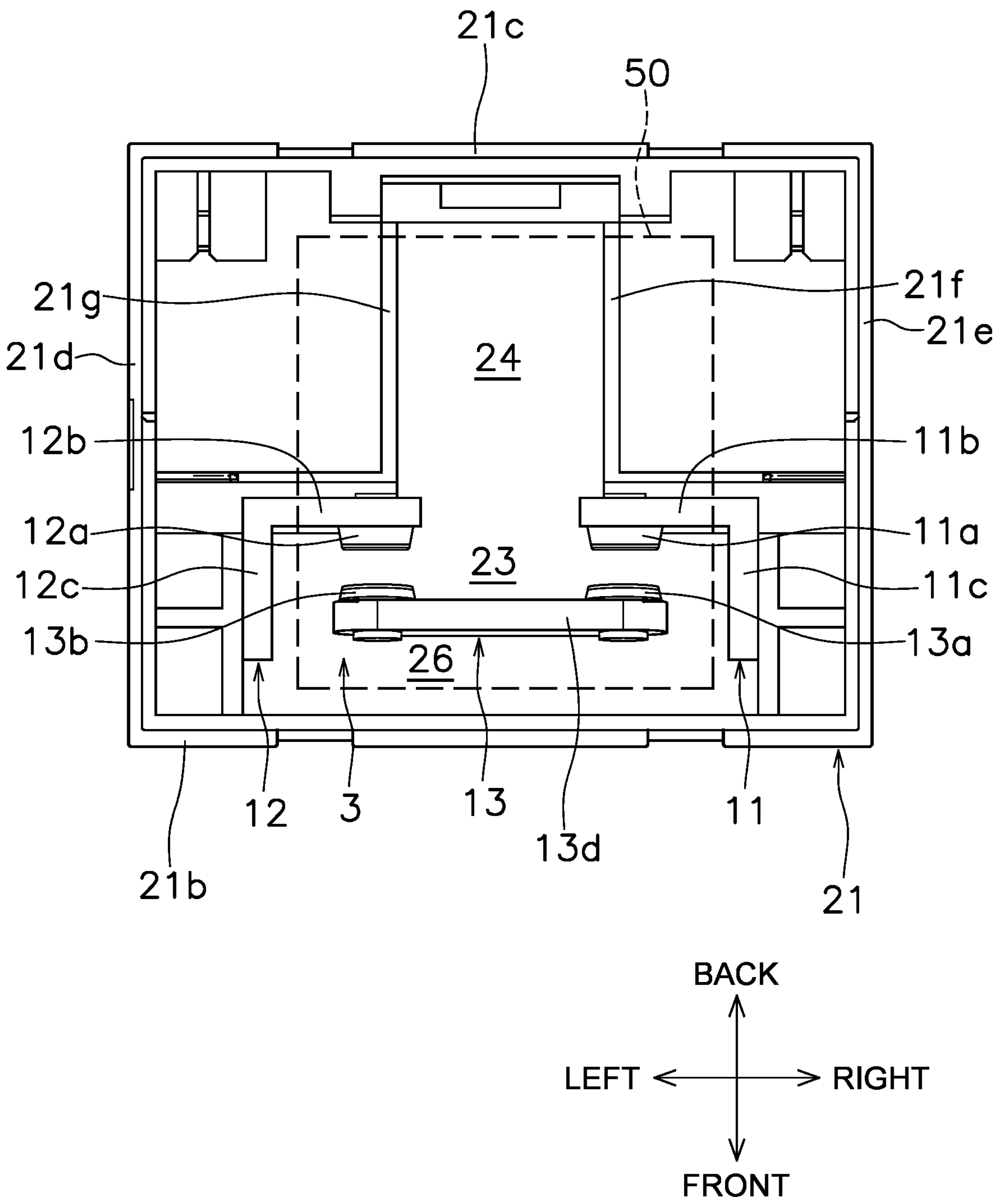
FIG. 3 is a view of a base and a contact device from above.

In the following description, the direction in which the contact device 3 and the drive device 4 are disposed with respect to a later-described base 21 of the case 2 is referred to as up, and the opposite direction is referred to as down. The direction in which the contact device 3 is disposed with respect to the drive device 4 is referred to as front (an example of a second direction), and the opposite is referred to as back (an example of a first direction). The left-right direction of the paper of FIG. 3 is referred to as left-right. However, these directions are defined only for convenience of description, and do not limit the arrangement directions of the electromagnetic relay 1.

The case 2 has a box shape. The case 2 is made of an insulating material such as resin. The case 2 includes a base 21 and a cover 22. The base 21 supports the contact device 3 and the drive device 4. The base 21 includes a bottom 21*a* and outer walls 21*b* to 21*e*. The bottom 21*a* extends in a direction orthogonal to the up-down direction. The outer wall 21*b* extends upward from the front edge of the bottom 21*a*. The outer wall 21*c* extends upward from the back edge of the bottom 21*a*. The outer wall 21*d* extends upward from the left edge of the bottom 21*a*. The outer wall 21*e* extends upward from the right edge of the bottom 21*a*.

The cover 22 is open downward and is attached to the outer walls 21*b* to 21*e* of the base 21 so as to cover the bottom 21*a* of the base 21 from above. The contact device 3 and the drive device 4 are accommodated in the case 2.

As shown in FIG. 3, the contact device 3 includes a first fixed terminal 11, a second fixed terminal 12, and a movable contact piece 13. In the following description, the first fixed terminal 11 and the second fixed terminal 12 may be referred to as fixed terminals 11 and 12.

The fixed terminals 11 and 12 are made of a conductive material such as copper. The fixed terminals 11 and 12 are plate-shaped terminals and has a bent shape. The fixed terminals 11 and 12 are generally L-shaped as viewed in the up-down direction. The fixed terminals 11 and 12 are supported by the bottom 21*a* of the base 21. In the present embodiment, the fixed terminals 11 and 12 are fixedly press-fitted to the bottom 21*a* of the base 21.

The first fixed terminal 11 includes a first fixed contact 11*a*, a first contact supporting portion 11*b*, a first extending portion 11*c*, and a first external connecting portion 11*d*.

The first fixed contact 11*a* is disposed on the front surface of the first fixed terminal 11. The first fixed contact 11*a* is fixedly caulked to the first fixed terminal 11. Note that the first fixed contact 11*a* may be integrated with the first contact supporting portion 11*b*. The first contact supporting portion 11*b* extends in a direction orthogonal to the front-back direction. The first contact supporting portion 11*b* supports the first fixed contact 11*a*.

The first extending portion 11*c* extends forward from the right end of the first contact supporting portion 11*b*. The first extending portion 11*c* is disposed to the right of a first movable contact 13*a*. The first extending portion 11*c* has a front end disposed further forward than a movable contact piece 13. The first external connecting portion 11*d* extends downward from the lower end of the first extending portion 11*c*. The first external connecting portion 11*d* protrudes downward from the bottom 21*a* of the base 21, and is electrically connected to an external device (not shown).

The second fixed terminal 12 is disposed apart from the first fixed terminal 11 to the left. The second fixed terminal 12 has a symmetrical shape with respect to the first fixed terminal 11. The second fixed terminal 12 includes a second fixed contact 12*a*, a second contact supporting portion 12*b*, a second extending portion 12*c*, and a second external connecting portion 12*d*.

The second fixed contact 12*a* is disposed on the front surface of the second contact supporting portion 12*b*. The second fixed contact 12*a* is fixedly caulked to the second contact supporting portion 12*b*. Note that the second fixed contact 12*a* may be integrated with the second contact supporting portion 12*b*. The second contact supporting portion 12*b* extends in a direction orthogonal to the front-back direction. The second contact supporting portion 12*b* supports the second fixed contact 12*a*.

The second extending portion 12*c* extends forward from the left end of the second contact supporting portion 12*b*.

The second extending portion 12*c* is disposed to the left of the second movable contact 13*b*. The second extending portion 12*c* has a front end disposed further forward than the movable contact piece 13. The second external connecting portion 12*d* extends downward from the lower end of the second extending portion 12*c*. The second external connecting portion 12*d* protrudes downward from the bottom 21*a* of the base 21 and is electrically connected to an external device (not shown).

The movable contact piece 13 is a plate-shaped terminal and is made of a conductive material such as copper. The movable contact piece 13 is disposed between the first extending portion 11*c* and the second extending portion 12*c*. In the present embodiment, the movable contact piece 13 has a longitudinal direction that coincides with the left-right direction. The movable contact piece 13 has a substantially T-shape when viewed from the front-back direction. The movable contact piece 13 includes a first movable contact 13*a*, a second movable contact 13*b*, an up-down extending portion 13*c*, and a left-right extending portion 13*d*.

The first movable contact 13*a* and the second movable contact 13*b* are fixedly caulked to the movable contact piece 13. The first movable contact 13*a* and the second movable contact 13*b* are disposed on the back surface of the left-right extending portion 13*d*. The first movable contact 13*a* faces the first fixed contact 11*a* in the front-back direction. The first movable contact 13*a* is able to be in contact with the first fixed contact 11*a*. The second movable contact 13*b* is disposed apart from the first movable contact 13*a* to the left. The second movable contact 13*b* faces the second fixed contact 12*a* in the front-back direction. The second movable contact 13*b* is able to be in contact with the second fixed contact 12*a*. The first movable contact 13*a* and the second movable contact 13*b* may be integrated with the movable contact piece 13.

The up-down extending portion 13*c* extends in the up-down direction and connected to, at the upper part, the drive device 4. The left-right extending portion 13*d* extends in the left-right direction from the lower part of the up-down extending portion 13*c*.

Here, the case 2 includes an accommodation space 23, a first arc extension space 24, a cover member 25 (see FIG. 5), and a second arc extension space 26.

The accommodation space 23 is disposed between the base 21 and the cover 22. The accommodation space 23 is between the first arc extension space 24 and the second arc extension space 26 in the front-back direction. The bottom 21*a* of the base 21 covers the accommodation space 23 from below. The accommodation space 23 is disposed between the outer wall 21*d* and the outer wall 21*e* in the left-right direction. The first fixed contact 11*a*, the first contact supporting portion 11*b*, the first extending portion 11*c*, the second fixed contact 12*a*, the second contact supporting portion 12*b*, and the second extending portion 12*c* are disposed in the accommodation space 23.

The first arc extension space 24 is in communication with the accommodation space 23. The first arc extension space 24 is adjacent to the accommodation space 23 and extends backward from the accommodation space 23. The first arc extension space 24 extends backward from between the first contact supporting portion 11*b* and the second contact supporting portion 12*b*. The first arc extension space 24 may be partially disposed at the back portion of the first contact supporting portion 11*b* and the back portion of the second contact supporting portion 12*b*.

Figure 5:
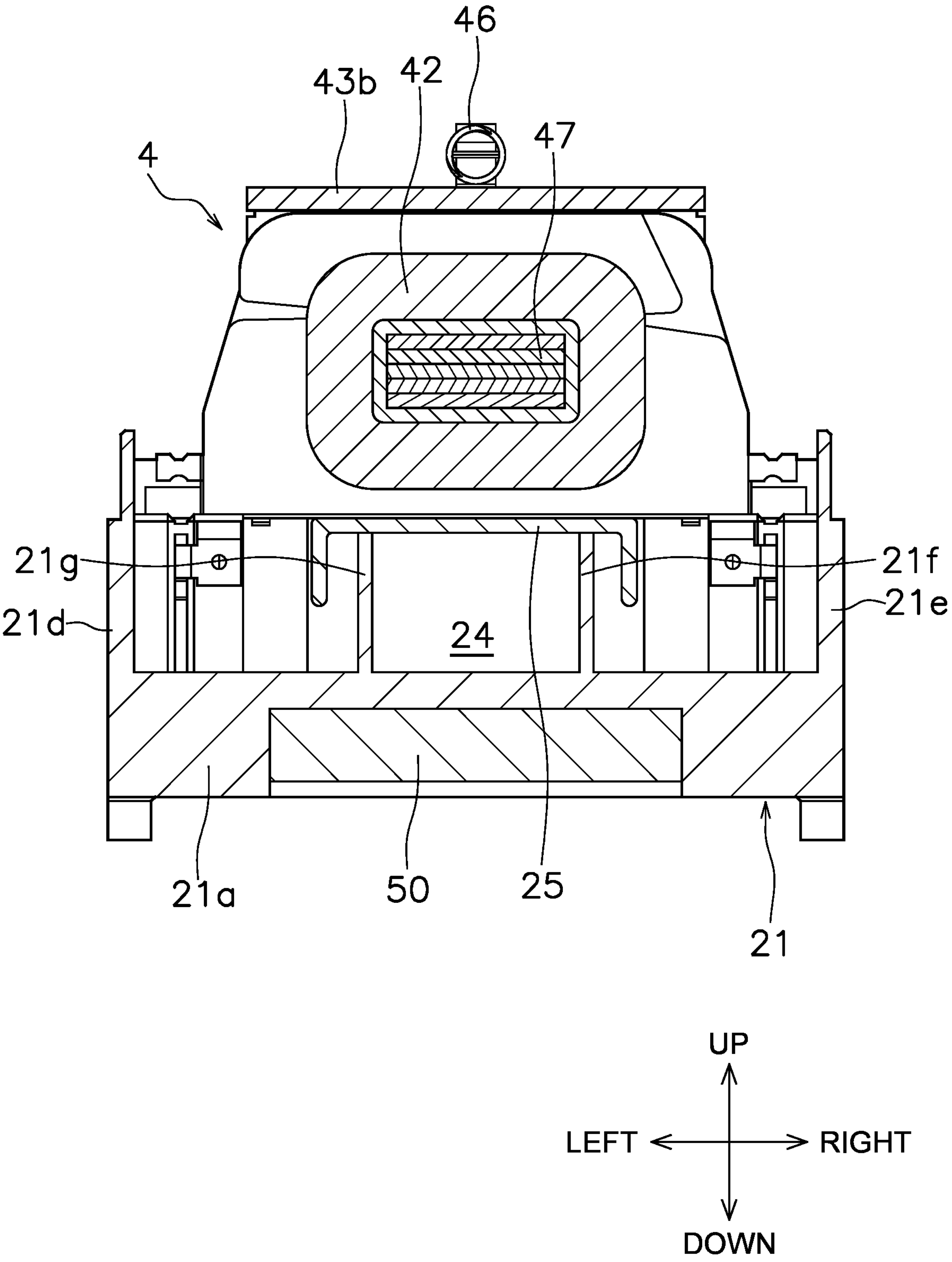
FIG. 5 is a cross-sectional view of an electromagnetic relay cut along a plane orthogonal to a front-back direction.

As shown in FIG. 5, the first arc extension space 24 is disposed between the drive device 4 and the bottom 21*a* of the base 21 in the up-down direction. The bottom 21*a* of the base 21 covers the first arc extension space 24 from below. The outer wall 21*c* covers the first arc extension space 24 from back. The first arc extension space 24 is disposed, in the left-right direction, between a pair of inner walls 21*f* and 21*g* on the base 21. The pair of inner walls 21*f* and 21*g* extend in a direction orthogonal to the left-right direction. The inner wall 21*f* is disposed behind the first contact supporting portion 11*b*, and the inner wall 21*g* is disposed behind the second contact supporting portion 12*b*.

The cover member 25 protects a later-described coil 42 from an arc A3 that is extended in the first arc extension space 24. The cover member 25 is disposed between the first arc extension space 24 and the coil 42. The cover member 25 covers the first arc extension space 24 from above. The cover member 25 is disposed on the upper part of the pair of inner walls 21*f* and 21*g*, and is supported by the pair of inner walls 21*f* and 21*g*. In the present embodiment, the cover member 25 is a separate body from the base 21, but may be integrated with the base 21.

As shown in FIG. 3, the second arc extension space 26 is disposed between the movable contact piece 13 and the outer wall 21*b* in the front-back direction. The second arc extension space 26 is disposed on the front surface side of the left-right extending portion 13*d* of the movable contact piece 13. The second arc extension space 26 is in communication with the accommodation space 23. The second arc extension space 26 is adjacent to the accommodation space 23 and extends forward from the accommodation space 23. The first extending portion 11*c* and the second extending portion 12*c* extend between the accommodation space 23 and the second arc extension space 26.

The drive device 4 is disposed above the contact device 3. The drive device 4 moves the movable contact piece 13 in a direction in which the first movable contact 13*a* approaches the first fixed contact 11*a* and in a direction in which the first movable contact 13*a* separates from the first fixed contact 11*a*. Further, the drive device 4 moves the movable contact piece 13 in a direction in which the second movable contact 13*b* approaches the second fixed contact 12*a* and in a direction in which the second movable contact 13*b* separates from the second fixed contact 12*a*. In the present embodiment, the drive device 4 moves the movable contact piece 13 in the front-back direction.

As shown in FIGS. 2 and 5, the drive device 4 includes a spool 41, a coil 42, a yoke 43, a movable iron piece 44, a resin member 45, a return spring 46, and a fixed iron core 47. The spool 41 is tubular and extends in the front-back direction.

The coil 42 is wound around the outer circumference of the spool 41. The coil 42 is disposed above with respect to the fixed terminals 11 and 12. The coil 42 is disposed behind with respect to the fixed terminals 11 and 12, the movable contact piece 13, and the accommodation space 23. The coil 42 is disposed above the cover member 25. The coil 42 overlaps with the first arc extension space 24 in the up-down direction. The coil 42 is disposed above the first arc extension space 24. The first arc extension space 24 extends backward with respect to the center of the coil 42 in the front-back direction.

The yoke 43 has an L-shaped bent shape. The yoke 43 includes a coupling portion 43*a* and an extending portion 43*b*. The coupling portion 43*a* is disposed behind the spool 41 and is coupled to the fixed iron core 47. The extending portion 43*b* extends forward from the upper end of the coupling portion 43*a* so as to cover over the upper part of the coil 42.

The movable iron piece 44 is in front of the fixed iron core 47. The movable iron piece 44 is rotatably supported by the yoke 43 at the front end of the extending portion 43*b*. The resin member 45 insulates the movable iron piece 44 and the movable contact piece 13. The resin member 45 couples the movable iron piece 44 and the movable contact piece 13. Specifically, the movable iron piece 44 and the movable contact piece 13 are made by insert-molding into the resin member 45. Thus, the resin member 45 and the movable contact piece 13 are rotatable integrally with the movable iron piece 44 in response to the rotation of the movable iron piece 44.

The return spring 46 is a coil spring and extends in the front-back direction. The return spring 46 has a front end connected to the movable iron piece 44 and a back end connected to the yoke 43. The return spring 46 forces the movable contact piece 13 forward via the movable iron piece 44 and the resin member 45. That is, the return spring 46 forces the movable contact piece 13 in a direction in which the first movable contact 13*a* separates from the first fixed contact 11*a* and in a direction in which the second movable contact 13*b* separates from the second fixed contact 12*a*. The fixed iron core 47 is a laminated iron core and disposed inside the spool 41. The fixed iron core 47 penetrates the spool 41 in the front-back direction. The fixed iron core 47 is disposed above with respect to the fixed terminals 11 and 12.

Next, the operation of the electromagnetic relay 1 will be described. While no voltage is applied to the coil 42, as shown in FIG. 3, by the elastic force of the return spring 46, the first movable contact 13*a* is separated from the first fixed contact 11*a* and the second movable contact 13*b* is separated from the second fixed contact 12*a*. When a voltage is applied to the coil 42 and the coil 42 is excited, the electromagnetic force causes the movable iron piece 44 to be attracted to the fixed iron core 47, which rotates the movable iron piece 44 against the elastic force of the return spring 46. Consequently, the movable contact piece 13 moves backward, the first movable contact 13*a* contacts the first fixed contact 11*a*, and the second movable contact 13*b* contacts the second fixed contact 12*a*. When the application of the voltage to the coil 42 is stopped, the movable iron piece 44 is rotated by the elastic force of the return spring 46. As a result, the movable contact piece 13 moves forward, the first movable contact 13*a* separates from the first fixed contact 11*a*, and the second movable contact 13*b* separates from the second fixed contact 12*a*.

Figure 4:
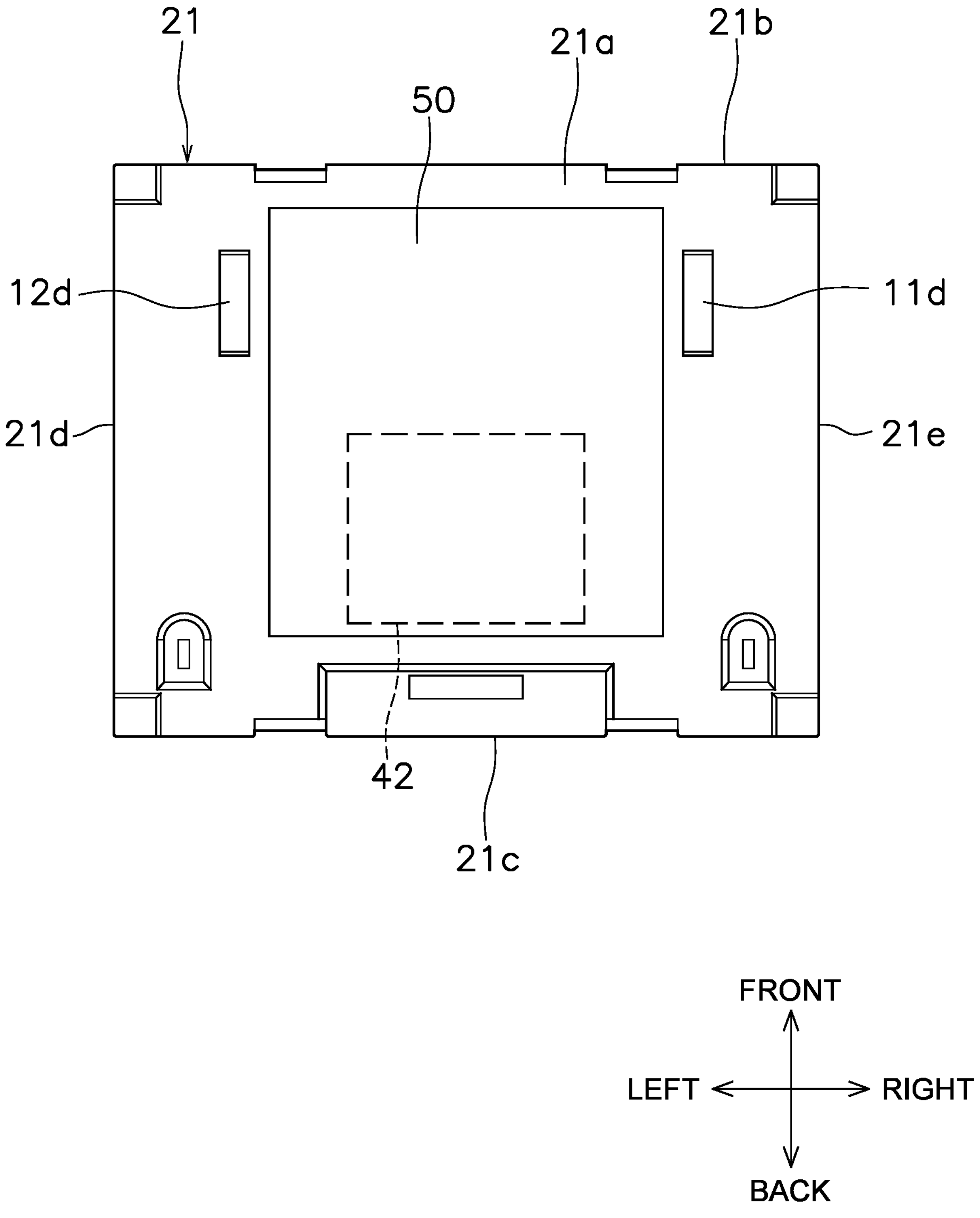
FIG. 4 is a bottom view of an electromagnetic relay.

As shown in FIGS. 3 to 5, the electromagnetic relay 1 includes a magnet 50. The magnet 50 is, for example, a rectangular permanent magnet. The magnet 50 is disposed at the bottom 21*a* of the base 21. In the preset embodiment, the magnet 50 is attached to the outer surface of the bottom 21*a* of the base 21.

The magnet 50 is disposed so as to overlap with the coil 42 and the accommodation space 23 in the up-down direction (an example of the third direction). The magnet 50 is disposed below the accommodation space 23 and the coil 42. The magnet 50 is disposed between the first external connecting portion 11*d* and the second external connecting portion 12*d*. The magnet 50 overlaps with the first fixed contact 11*a*, the second fixed contact 12*a*, and the movable contact piece 13 in the up-down direction. The magnet 50 extends in the left-right direction beyond the movable contact piece 13. The magnet 50 has a front end disposed forward with respect to the movable contact piece 13 when viewed from the up-down direction. In the present embodiment, the movable contact piece 13 overlaps entirely with the magnet 50 in the up-down direction. The magnet 50 extends backward with respect to the center of the coil 42 in the front-back direction. Both ends of the magnet 50 in the left-right direction are disposed outside both ends of the coil 42 in the left-right direction. The magnet 50 overlaps with the first arc extension space 24 in the up-down direction. The first arc extension space 24 is disposed at least partially between the coil 42 and the magnet 50. In the present embodiment, the first arc extension space 24 is disposed entirely between the coil 42 and the magnet 50.

Figure 6:
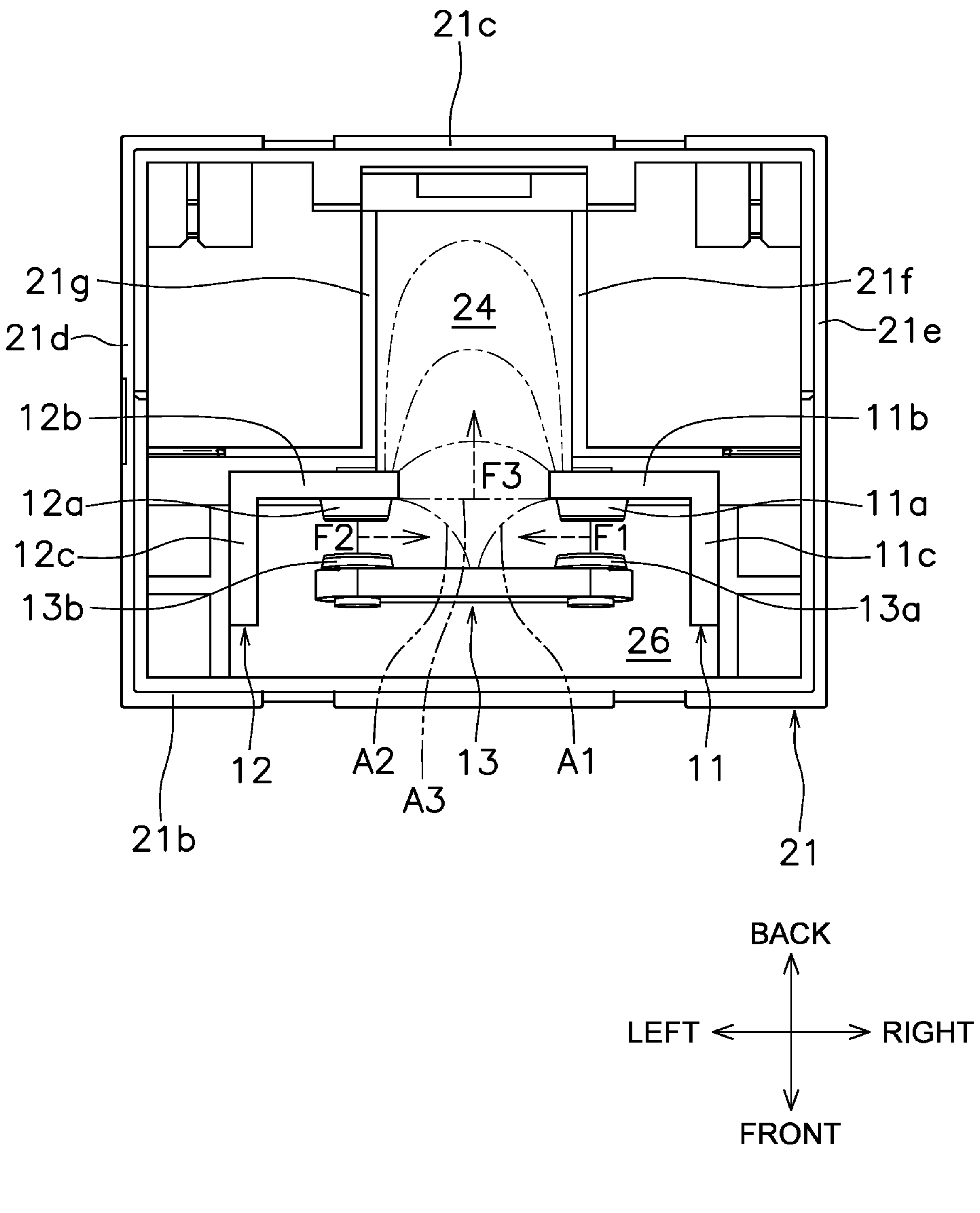
FIG. 6 is a diagram for explaining a driving of a first arc and a second arc.
Figure 7:
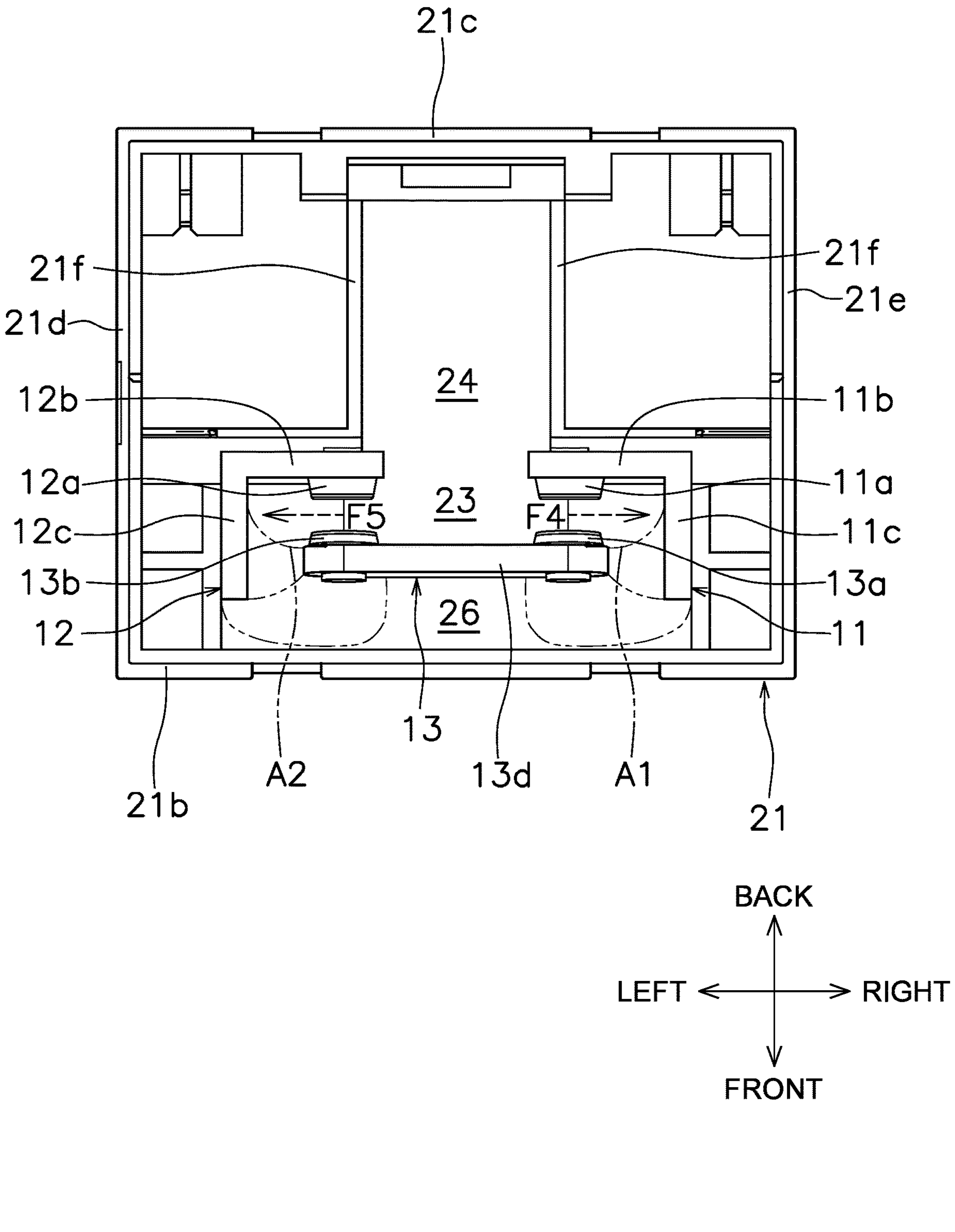
FIG. 7 is a diagram for explaining a driving of a first arc and a second arc.

As shown in FIGS. 6 and 7, the magnet 50 extends, in the longitudinal direction of the movable contact piece 13 (here, the left-right direction), a first arc A1 generated between the first fixed contact 11*a* and the first movable contact 13*a* and a second arc A2 generated between the second fixed contact 12*a* and the second movable contact 13*b*. The magnet 50 extends the first arc A1 and the second arc A2 inward or outward in the longitudinal direction of the movable contact piece 13, depending on the energization direction. The inward direction of the movable contact piece 13 in the longitudinal direction is a direction approaching the center of the movable contact piece 13 in the longitudinal direction, in the longitudinal direction of the movable contact piece 13. The outward direction of the movable contact piece 13 in the longitudinal direction is a direction separating away from the center of the movable contact piece in the longitudinal direction, in the longitudinal direction of the movable contact piece 13. That is, the magnet 50 extends the first arc A1 and the second arc A2 in a direction in which the first arc A1 and the second arc A2 approach each other or separate from each other, depending on the energization direction.

The magnet 50 generates a magnetic field along the up-down direction between the first fixed contact 11*a* and the first movable contact 13*a* and between the second fixed contact 12*a* and the second movable contact 13*b*. In the present embodiment, the magnet 50 is magnetized so as to have the N pole at the upper surface and the S pole at the lower surface. With the configuration, the magnet 50 generates a magnetic field upward between the first fixed contact 11*a* and the first movable contact 13*a* and between the second fixed contact 12*a* and the second movable contact 13*b*. Also, the magnet 50 generates a magnetic field upward in the first arc extension space 24 and the second arc extension space 26.

As shown in FIG. 6, when a current flows from the first fixed contact 11*a* toward the first movable contact 13*a*, a leftward Lorentz force F1 acts on a first arc A1, and a rightward Lorentz force F2 acts on a second arc A2. As a result, the first arc A1 and the second arc A2 are extended in a direction approaching each other, and the first arc A1 and the second arc A2 are short-circuited between the first fixed terminal 11 and the second fixed terminal 12. Then, a backward Lorentz force F3 acts on an arc A3 short-circuited between the first fixed terminal 11 and the second fixed terminal 12, which extends the arc A3 short-circuited between the first fixed terminal 11 and the second fixed terminal 12 in the first arc extension space 24.

As shown in FIG. 7, when a current flows from the first movable contact 13*a* toward the first fixed contact 11*a*, a rightward Lorentz force F4 acts on the first arc A1. As a result, the first arc A1 moves from the first contact supporting portion 11*b* to the first extending portion 11*c* of the first fixed terminal 11 and is extended in the second arc extension space 26. Further, a leftward Lorentz force F5 acts on the second arc A2. Consequently, the second arc A2 moves from the second contact supporting portion 12*b* to the second extending portion 12*c* of the second fixed terminal 12 and is extended in the second arc extension space 26.

In the electromagnetic relay 1 described above, the first arc A1 and the second arc A2 are extended in the longitudinal direction of the movable contact piece 13 by the magnet 50. When a current flows from the first fixed contact 11*a* toward the first movable contact 13*a*, the first arc A1 and the second arc A2 are extended in a direction approaching each other, and the first arc A1 and the second arc A2 are short-circuited between the first fixed terminal 11 and the second fixed terminal 12. The short-circuited arc A3 between the first fixed terminal 11 and the second fixed terminal 12 is extended, by the magnetic field generated by the magnet 50, in the first arc extension space 24 disposed between the coil 42 and the magnet 50. As a result, the short-circuited arc A3 between the first fixed terminal 11 and the second fixed terminal 12 can be quickly cut off.

Since the first arc extension space 24 is disposed below the coil 42, the space below the coil 42 can be effectively used to quickly cut off the arc A3.

Further, when a current flows from the first movable contact 13*a* toward the first fixed contact 11*a*, the first arc A1 and the second arc A2 can be quickly cut off in the second arc extension space 26. In the present embodiment, since the first extending portion 11*c* and the second extending portion 12*c* extend to the second arc extension space 26, the first arc A1 and the second arc A2 can be rapidly moved to the second arc extension space 26.

One embodiment of the present invention has been described above, but the present invention is not limited to the above embodiment, and various modifications can be made without departing from the gist of the invention.

The configurations of the contact device 3 and the drive device 4 may be modified. For example, the drive device 4 may have a plunger-type structure. The configuration of the case 2 may be modified.

In the above embodiment, the base 21 is composed of a single member, but the base 21 may be composed of a plurality of components including a first component on which the contact device 3 is mounted and a second component on which the drive device 4 is mounted. For example, the accommodation space 23, the first arc extension space 24, and the second arc extension space 26 may be disposed in the first component, and the second component may cover over the first arc extension space 24. In this case, the second component also functions as the cover member 25.

Figure 8:
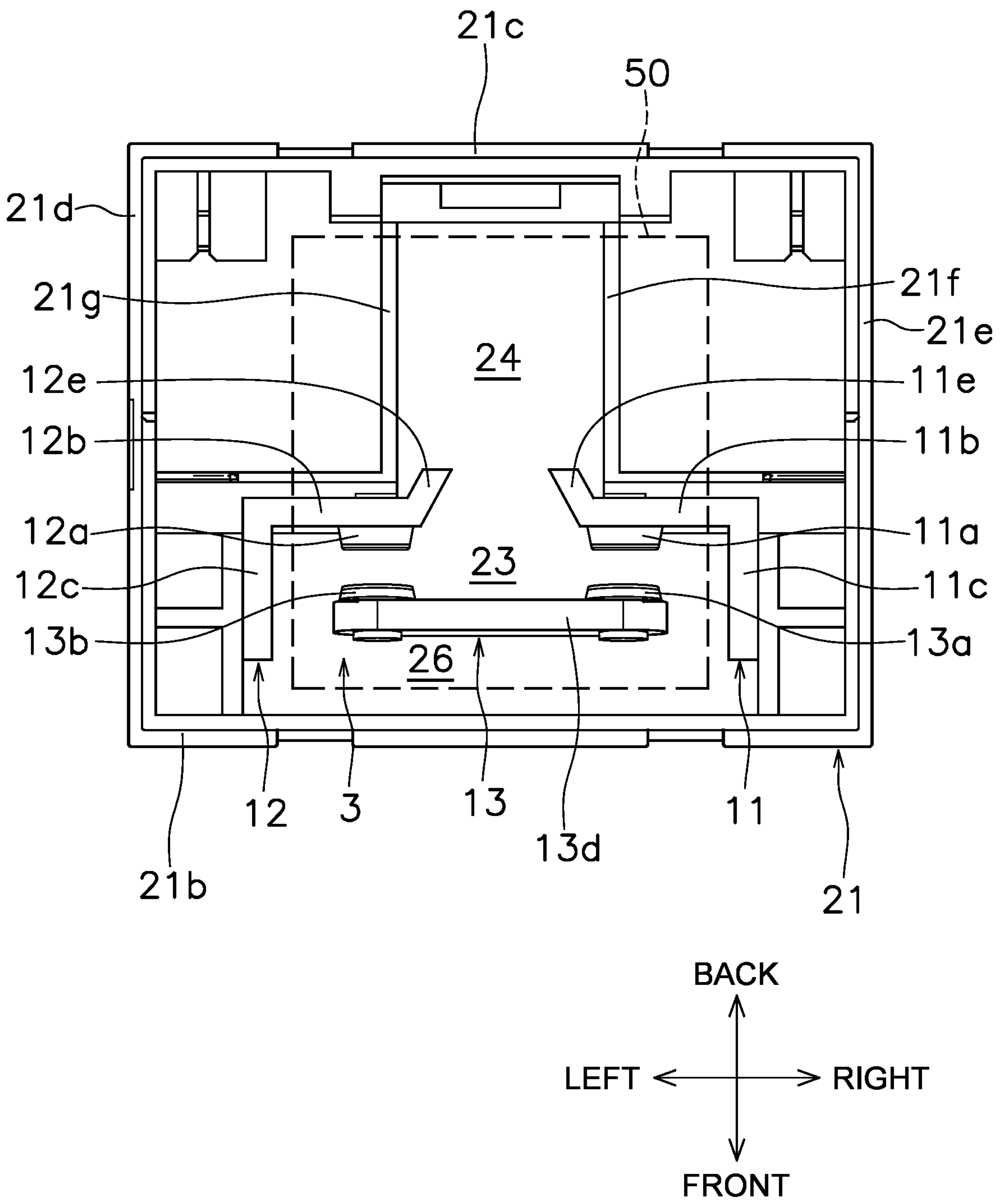
FIG. 8 is a view of a contact device according to a first modification as viewed from above.

As shown in FIG. 8, the first fixed terminal 11 may include a first bent portion 11*e*. The first bent portion 11*e* has a shape bent from the inner end (here, the left end) of the first contact supporting portion 11*b* toward the first arc extension space 24. The first bent portion 11*e* has a shape bent in a direction away from the movable contact piece 13. The first bent portion 11*e* inclines in a direction approaching the second fixed terminal 12 toward the first arc extension space 24. Note that, the inner end of the first contact supporting portion 11*b* is the end, out of both ends of the first contact supporting portion 11*b* in the longitudinal direction of the movable contact piece 13, that is closer to the second fixed terminal 12. Similarly, the second fixed terminal 12 may include a second bent portion 12*e*. The second bent portion 12*e* has a shape bent from the inner end (here, the right end) of the second contact supporting portion 12*b* toward the first arc extension space 24. The second bent portion 12*e* inclines in a direction approaching the first fixed terminal 11 toward the first arc extension space 24.

Figure 9:
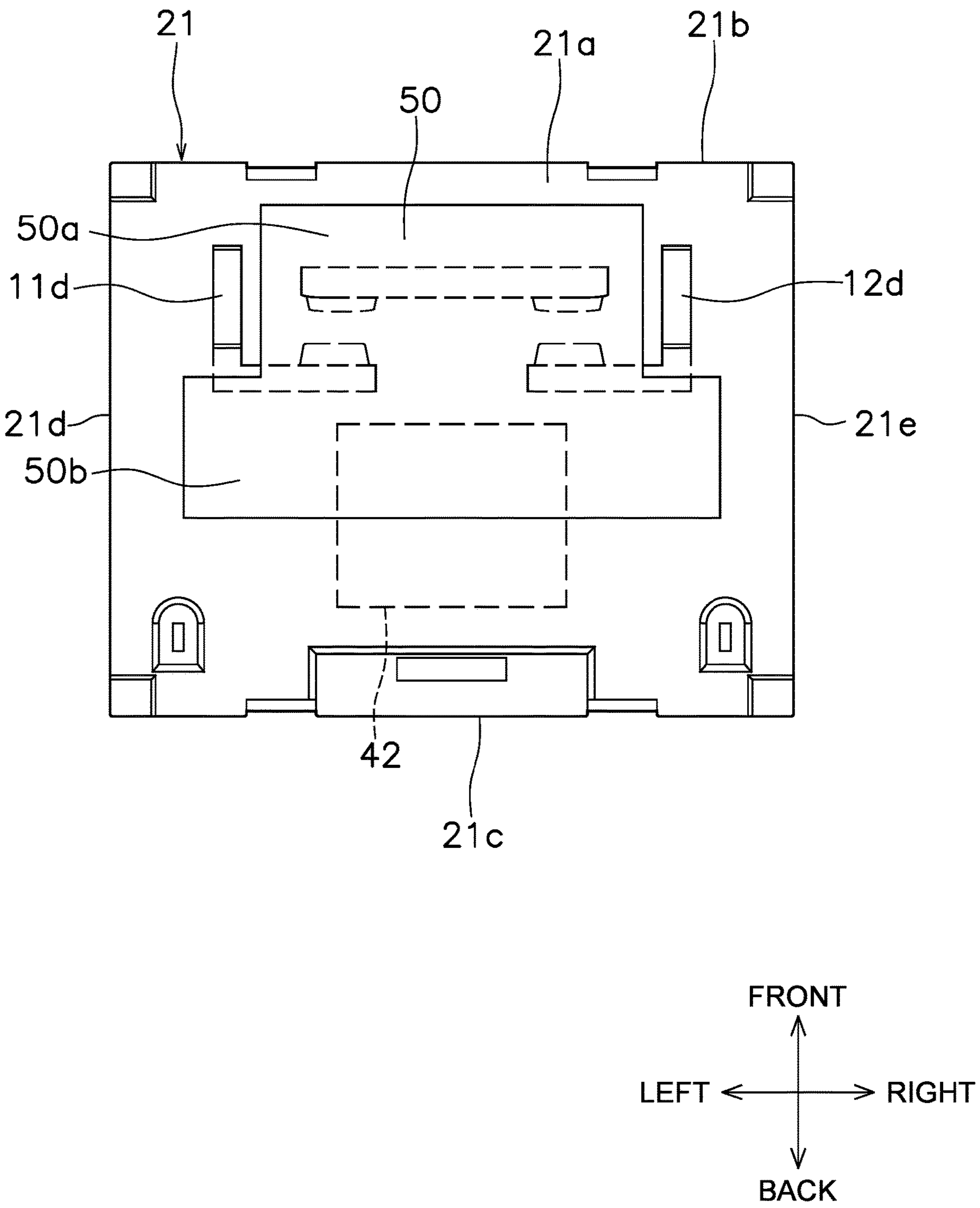
FIG. 9 is a bottom view of an electromagnetic relay according to a second modification.

The arrangement and shape of the magnet 50 may be changed. As shown in FIG. 9, the magnet 50 may include a narrow portion 50*a* and a wide portion 50*b*. The narrow portion 50*a* is disposed between the first external connecting portion 11*d* and the second external connecting portion 12*d*. The narrow portion 50*a* is below the accommodation space 23. The wide portion 50*b* extends in the left-right direction beyond the narrow portion 50*a*. The wide portion 50*b* is disposed below the coil 42 and the first arc extension space 24, and overlaps with the coil 42 and the first arc extension space 24 in the up-down direction. The wide portion 50*b* extends outward, in the longitudinal direction of the movable contact piece 13, with respect to the first external connecting portion 11*d* and the second external connecting portion 12*d*. The left end of the wide portion 50*b* is disposed to the left of the first external connecting portion 11*d*. The right end of the wide portion 50*b* is disposed to the right of the second external connecting portion 12*d*.

Figure 10:
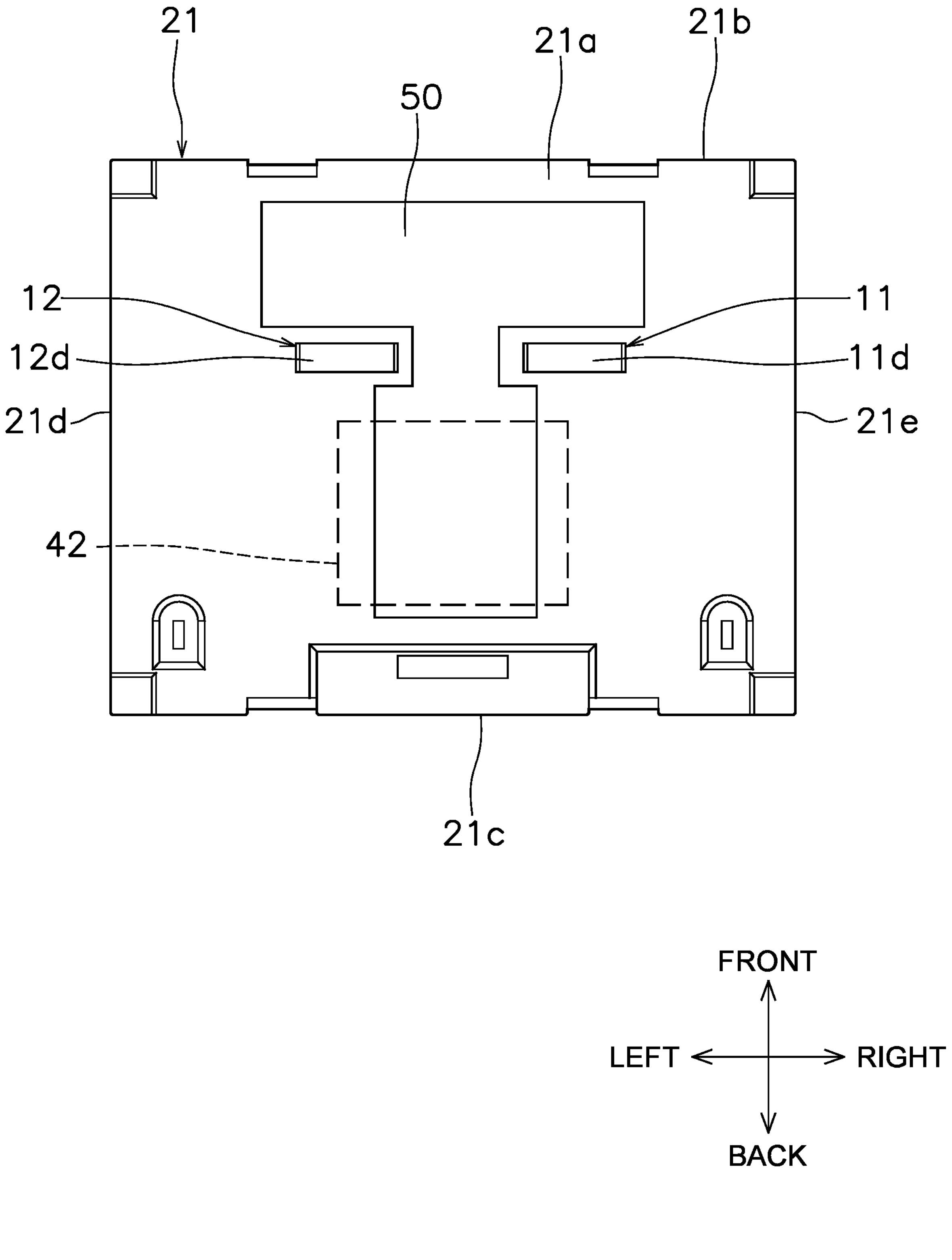
FIG. 10 is a bottom view of an electromagnetic relay according to a third modification.

As shown in FIG. 10, the first fixed terminal 11 may have a configuration in which the first contact supporting portion 11*b* overlaps with the first external connecting portion 11*d* in the up-down direction. That is, the first fixed terminal 11 and the second fixed terminal 12 may be plate-shaped terminals extending linearly in the up-down direction. In this case, the magnet 50 may have a shape that avoids the first external connecting portion 11*d* and the second external connecting portion 12*d*.

Figure 11:
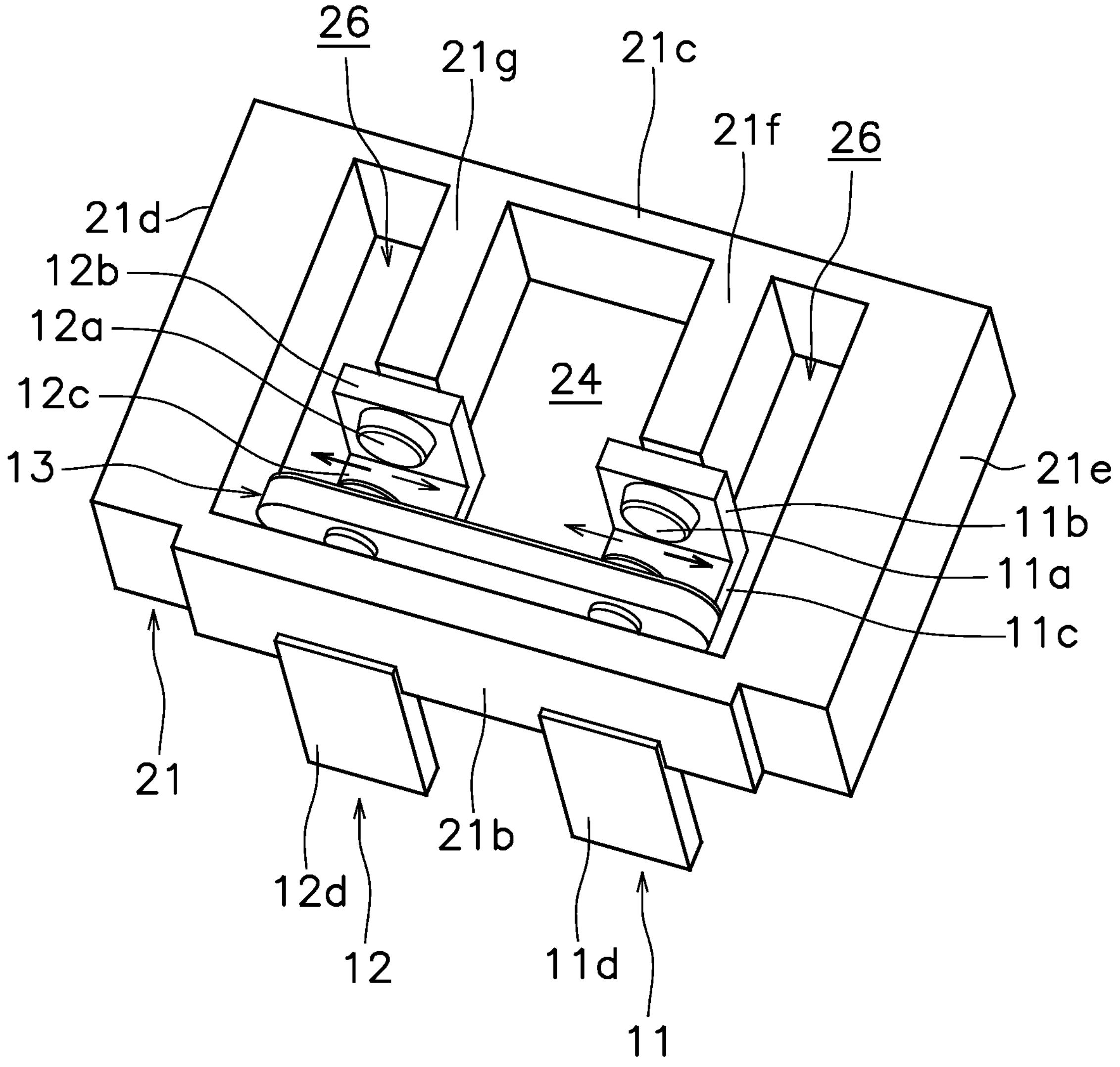
FIG. 11 is a perspective view of a base according to a fourth modification.

In the above embodiment, the second arc extension space 26 is disposed between the movable contact piece 13 and the outer wall 21*b* in the front-back direction, but the location of the second arc extension space 26 may be changed. For example, as shown in FIG. 11, the second arc extension space 26 may be disposed side by side with the first arc extension space 24 in the left-right direction. The second arc extension space 26 is disposed adjacent to the first arc extension space 24 outward in the longitudinal direction of the movable contact piece. The first arc extension space 24 and the second arc extension space 26 are partitioned by a pair of inner walls 21*f* and 21*g* in the left-right direction. The second arc extension space 26 is disposed below the coil 42. Note that, the second arc extension space 26 does not have to overlap with the coil 42 in the up-down direction. The second arc extension space 26 is disposed between the inner wall 21*f* and the outer wall 21*e* and between the inner wall 21*g* and the outer wall 21*d*. The pair of inner walls 21*f* and 21*g* may be eliminated to connect the second arc extension space 26 to the first arc extension space 24.

Figure 12:
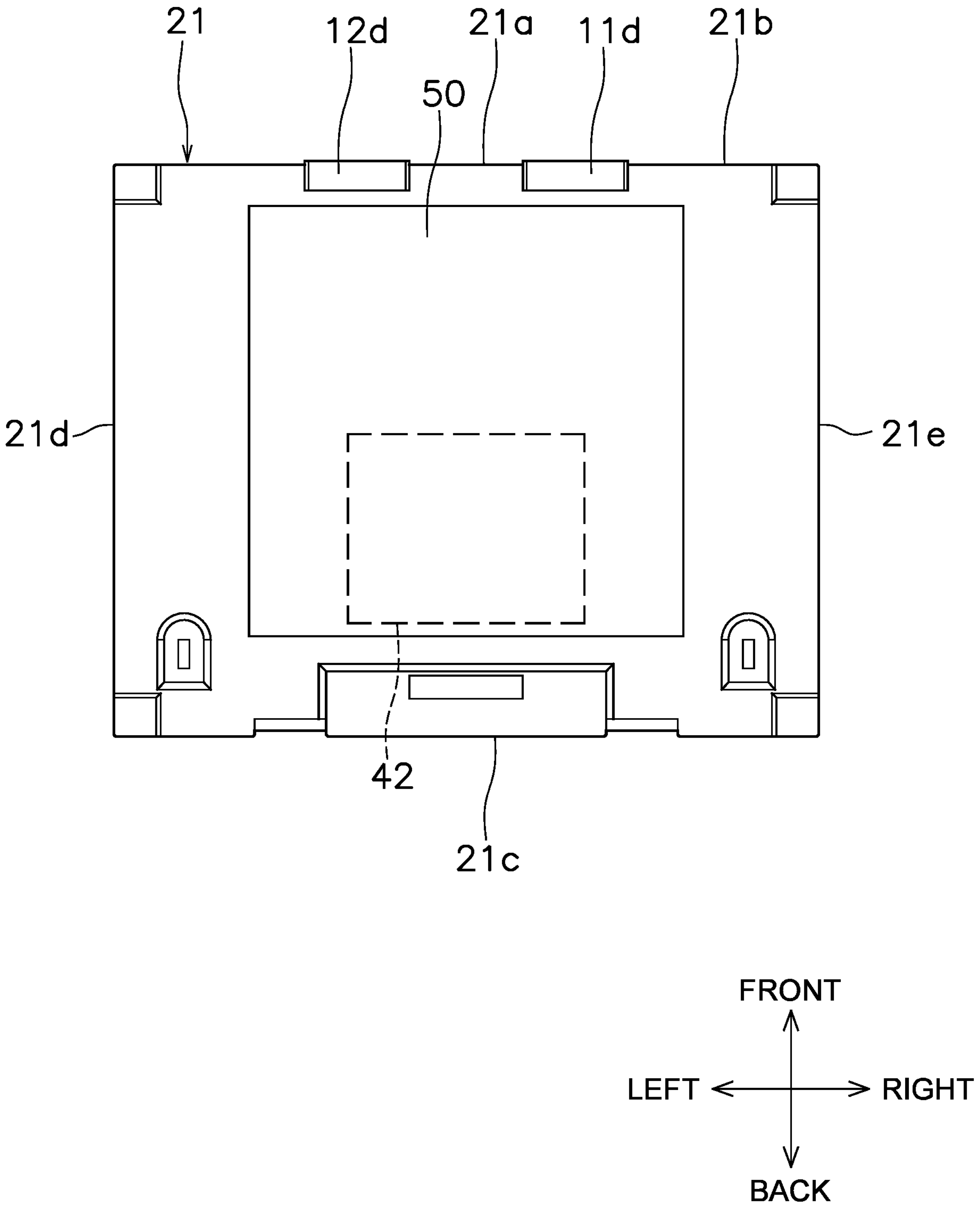
FIG. 12 is a bottom view of an electromagnetic relay according to the fourth modification.
Figure 13:
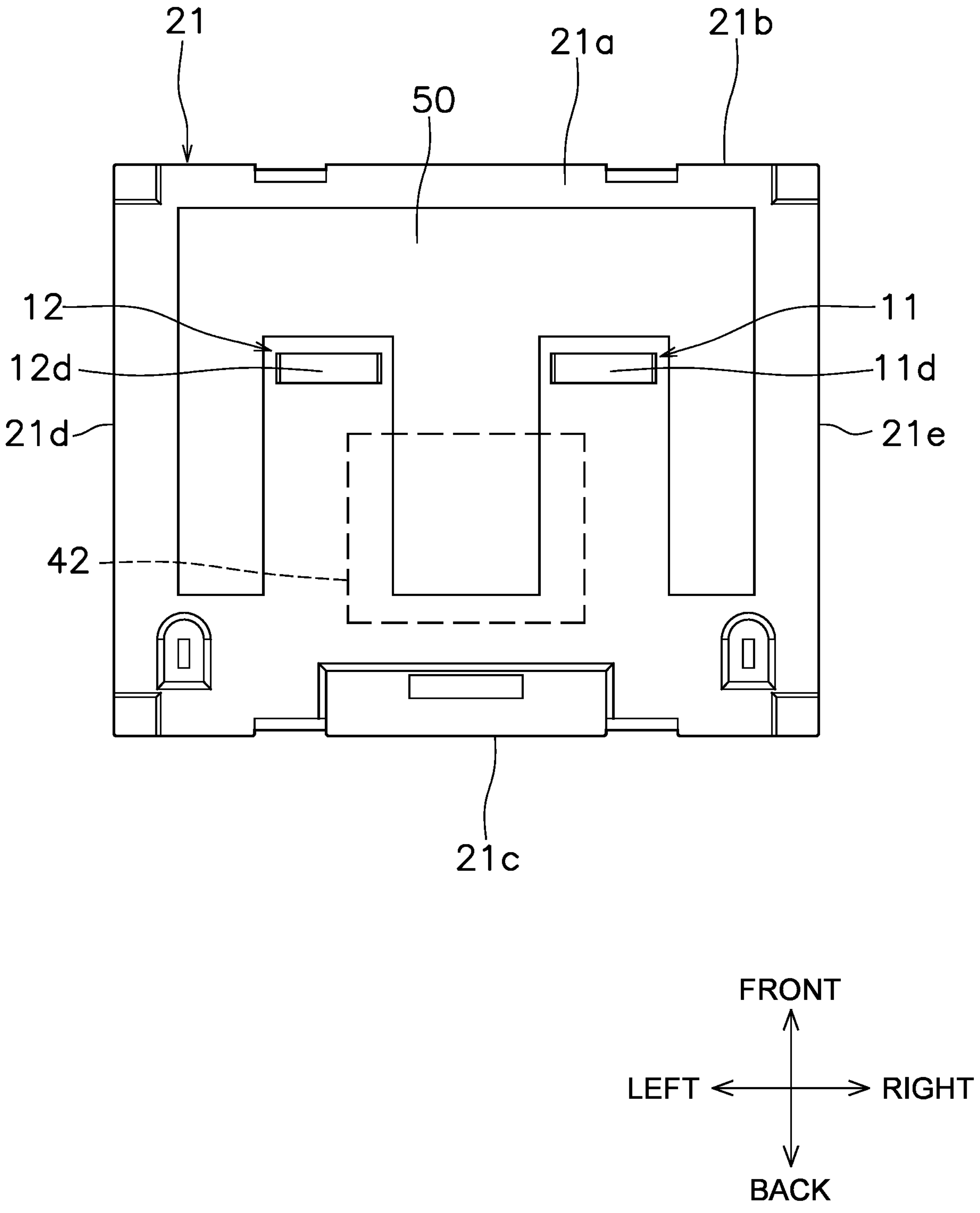
FIG. 13 is a bottom view of the electromagnetic relay according to a fifth modification.

In the configuration shown in FIG. 11, the first extending portion 11*c* of the first fixed terminal 11 extends forward from the lower end of the first contact supporting portion 11*b*. The first external connecting portion 11*d* extends downward from the front end of the first extending portion 11*c*. The first external connecting portion 11*d* projects downward from the bottom 21*a* in the vicinity of the outer wall 21*b*. The second fixed terminal 12 also has a similar shape to that of the first fixed terminal 11. In this case, as shown in FIG. 12, the magnet 50 may have a shape that does not avoid the first external connecting portion 11*d* and the second external connecting portion 12*d*. Note that, in a case where the first fixed terminal 11 and the second fixed terminal 12 are each a plate-shaped terminal extending linearly in the up-down direction, as shown in FIG. 13, the magnet 50 may have a shape that avoids the space behind the first external connecting portion 11*d* and the second external connecting portion 12*d*.

REFERENCE NUMERALS

1 Electromagnetic relay

2 Case

4 Drive device
11 First fixed terminal
11*a* First fixed contact
11*c* First extending portion
11*d* First external connecting portion
11*e* First bent portion
12 Second fixed terminal
12*a* Second fixed contact
12*d* Second external connecting portion
13 Movable contact piece
13*a* First movable contact
13*b* Second movable contact
21 Base
23 Accommodation space
24 First arc extension space
25 Cover member
26 Second arc extension space
42 Coil
50 Magnet

The invention claimed is:

1. An electromagnetic relay comprising:

a first fixed terminal including a first fixed contact;

a second fixed terminal disposed apart from the first fixed terminal, the second fixed terminal including a second fixed contact;

a movable contact piece including a first movable contact facing the first fixed contact and a second movable contact facing the second fixed contact;

a drive device including a coil disposed in a first direction with respect to the movable contact piece, the first direction extending from the first movable contact toward the first fixed contact, the drive device configured to move the movable contact piece in a moving direction including the first direction and a second direction in which the first movable contact is separated from the first fixed contact;

a case including an accommodation space accommodating the first fixed contact, the second fixed contact, and the movable contact piece; and a magnet disposed to overlap with the coil and the accommodation space in a third direction orthogonal to the moving direction and a longitudinal direction of the movable contact piece, the magnet configured to extend a first arc generated between the first fixed contact and the first movable contact and a second arc generated between the second fixed contact and the second movable contact in the longitudinal direction of the movable contact piece, the case including a first arc extension space extending from the accommodation space in the first direction, the first arc extension space being at least partially disposed between the coil and the magnet.

2. The electromagnetic relay according to claim 1, wherein the case includes a base disposed below the coil, the first fixed terminal includes a first external connecting portion protruding downward from the base, the second fixed terminal includes a second external connecting portion protruding downward from the base, and the first arc extension space of the case is disposed between the base and the coil.

3. The electromagnetic relay according to claim 2, wherein the magnet includes a narrow portion disposed between the first external connecting portion and the second external connecting portion, the narrow portion overlapping with the accommodation space in the third direction, and a wide portion extending outward beyond the first external connecting portion and the second external connecting portion in the longitudinal direction of the movable contact piece, the wide portion overlapping with the coil in the third direction.

4. The electromagnetic relay according to claim 2, wherein the case includes a second arc extension space disposed outwardly adjacent to the first arc extension space in the longitudinal direction of the movable contact piece, the second arc extension space partitioned from the first arc extension space, and the magnet is disposed to overlap with the second arc extension space in the third direction.

5. The electromagnetic relay according to claim 1, wherein the case includes a second arc extension space disposed in the second direction with respect to the movable contact piece, and the magnet is disposed to overlap with the second arc extension space in the third direction.

6. The electromagnetic relay according to claim 5, wherein the first fixed terminal includes a first extending portion facing the movable contact piece in the longitudinal direction of the movable contact piece, and the first extending portion extends between the accommodation space and the second arc extension space.

7. The electromagnetic relay according to claim 1, wherein the first fixed terminal further includes a first contact supporting portion configured to support the first fixed contact, the first contact supporting portion disposed in the accommodation space and extending in the longitudinal direction of the movable contact piece, and a first bent portion bent toward the first arc extension space from an inner end of the first contact supporting portion in the longitudinal direction of the movable contact piece.

8. The electromagnetic relay according to claim 1, wherein the case includes a cover member disposed between the first arc extension space and the coil, the cover member covering the first arc extension space.

* * * * *